United States Patent Office 2,905,116
Patented Sept. 22, 1959

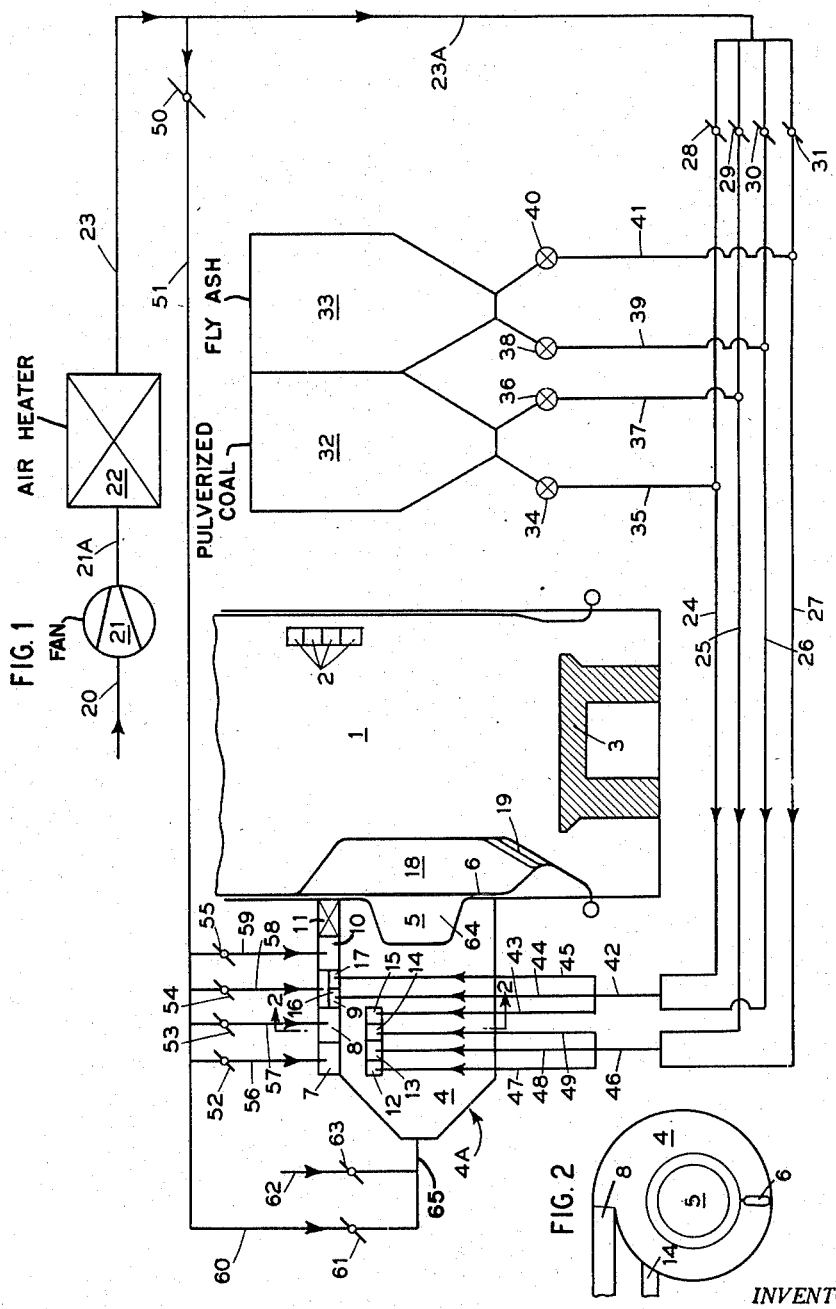

2,905,116

FUEL BURNING APPARATUS

Andreas Sifrin and Hermann Hennecke, Oberhausen, Rhineland, Germany, assignors to The Babcock & Wilcox Company, New York, N.Y., a corporation of New Jersey Application April 4, 1955, Serial No. 499,179

Claims priority, application Germany April 3, 1954

8 Claims. (Cl. 110—28)

The present invention relates to the construction and operation of apparatus for burning of a particle-form slag-forming solid fuel in a helical flow path in a furnace chamber of circular transverse cross-section under combustion conditions providing a mean furnace temperature above the fuel ash fusion temperature, thus insuring the separation in and discharge of the fuel ash residue from the furnace chamber as a molten slag. Approximately 85–90% of the recoverable ash in the fuel is separated in the furnace chamber in this manner and discharged in a stream through a slag outlet located in a lower part of the furnace chamber.

In the operation of a cyclone furnace of the character described, the centrifugal effect on the burning fuel and air stream causes the separated slag particles to deposit in a fluid condition on the walls of the furnace chamber and form a fluid layer of slag thereon onto which the coarser fuel particles are deposited and burned in situ by the scrubbing action of the secondary air streams. The excess slag flows down the furnace chamber walls and collects in the lowermost section of the chamber where the slag outlet is normally located.

The cyclone furnace is particularly suitable for the combustion of low quality fuels, the heating values of which are low as a result of high ash content, since it enables the ash content to be discharged in molten form as slag. One of the lowest quality available fuels is fly ash, which is characterized by a high ash, low volatile carbon content, and a relatively low heat content. Because of these characteristics great difficulty is encountered in igniting this fuel, which generally can be overcome only by burning simultaneously in the cyclone furnace a high quality ash-containing fuel, such as pulverized bituminous or semi-bituminous coal.

The fly ash leaving solid fuel fired fluid heating units can be collected in a dust collector. The collected fly ash can be returned to a cyclone furnace and melted into liquid slag when the furnace is also fired with a fuel of relatively high quality. This eliminates any fly ash handling outside of the boiler room.

The present invention is concerned with a special construction and mode of operation of a cyclone furnace particularly adapted for the burning or disposal of a low quality high ash content fuel in conjunction with the burning of a high quality ash containing fuel. In particular, the present invention provides for introducing in regulated amounts a mixture of primary air, high quality fuel, and low quality fuel, such as fly ash, through a plurality of tangentially arranged fuel inlets distributed along the length of a cyclone furnace with its major axis substantially horizontal, with the fuels so mixed and distributed that the mixture having the highest ratio of high quality fuel to low quality fuel is arranged to travel through the longest combustion path and the mixture having the lowest ratio of high quality fuel to low quality fuel is arranged to travel through a shorter portion of the same combustion path. The secondary air required for completion of the fuel burning is introduced into the cyclone furnace chamber through tangentially arranged air ports, with the air pressures therein so regulated that the highest secondary air port pressure is located at the far end of the longest combustion path and the lowest secondary air port pressure at the far end of the shorter portion of the combustion path. The secondary air port pressures are so regulated that the whirling burning fuel and air stream is forced to move forwardly to the front end of the chamber, reverse inwardly, and then move rearwardly to the gas outlet. The rear end of the furnace chamber is advantageously also provided with an auxiliary supply of high quality fuel and air to provide a high temperature zone in an annulus surrounding the gas outlet and thus prevent the deposition of slag in this area.

The various features of novelty which characterize our invention are pointed out with particularity in the claims annexed to and forming a part of this specification. For a better understanding of the invention, its operating advantages and specific objects attained by its use, reference should be had to the accompanying drawings and descriptive matter in which a practical embodiment of the invention has been illustrated and described.

Of the drawings:

Fig. 1 is a diagrammatic sectional elevation of a cyclone furnace fired steam generating unit embodying our invention; and Fig. 2 is a transverse cross-section through the cyclone furnace taken on the line 2—2 of Fig. 1.

In the steam generating unit illustrated, the furnace 1 is fired in a known manner with pulverized coal, which together with combustion air, is blown to the furnace 1 through corner burner nozzles 2. The bottom closure of the furnace 1 is formed in known manner by a slag table 3. The heating gases generated leave the upper end of the furnace 1 and contact with convection heated fluid heating tubes (not shown).

A high quality fuel, such as pulverized or granulated bituminous or semi-bituminous coal, is stored in a bunker 32 and a low quality fuel, such as fly ash, is stored in a bunker 33. From the bunker 32, the high quality fuel is discharged alternately or simultaneously through a regulable feeder 34 and a conduit 35 to a conduit 24 and through a regulable feeder 36 and a conduit 37 to a conduit 25. Similarly the low quality fuel is discharged from the bunker 33 alternately or simultaneously through a regulable feeder 38 and a conduit 39 to a conduit 26 and through a regulable feeder 40 and a conduit 41 to a conduit 27.

Air under a relatively high positive pressure is supplied to a cyclone furnace 4A by a fan 21 receiving a supply of air through a conduit 20 and discharging through a conduit 21A into a waste gas air heater 22 and then into a conduit 23. A part of the preheated air supply is discharged through a branch air conduit 51, this being hereinafter termed the secondary air. The remaining or primary air is discharged through a branch conduit 23A into four branches 24, 25, 26 and 27, provided with regulable dampers 28, 29, 30 and 31, respectively.

The high quality fuel discharging from the conduits 35 and 37 and the low quality fuel discharging from the conduits 39 and 41 are picked up by the regulable streams of primary air passing through the conduits 24, 25, 26 and 27. The conduits 24 and 26 discharge into a mixing conduit 42, which is connected to cyclone furnace fuel inlets 15, 16 and 17 by branch conduits 43, 44 and 45, respectively. The fuel inlets 16 and 17 are arranged in the lower part of a secondary air port 9 positioned tangentially to the cyclone furnace chamber 4. The conduits 25 and 27 discharge into a mixing tube 46, which is connected to fuel inlets 12, 13 and 14 by branch conduits 47, 48 and 49. The fuel inlets 12, 13 and 14 are arranged along the circumference of the furnace chamber 4, parallel to the major axis of said furnace chamber, intermediate of the said major axis and secondary air ports, and forward of the fuel inlet 15. With this arrangement and suitable control of the feeders 34, 36, 38 and 40 and of the dampers 28, 29, 30 and 31, the high quality fuel/low quality fuel/primary air mixture ratio to the fuel inlets 12, 13 and 14 can be varied from the mixture ratio delivered to the fuel inlets 15, 16 and 17.

The rear end of the furnace chamber 4a is provided with an auxiliary supply of high quality fuel and air 11 to provide a high temperature zone in an annulus surrounding the gas outlet 5 and in this manner prevent the deposition of slag in this area. Inlet 11 can be arranged similar to the secondary air port 9-fuel inlets 16, 17 arrangement.

The branch conduit 51, through which secondary air passes, is provided with a regulable damper 50 and is connected to secondary air ports 7, 8, 9 and 10 by branch conduits 56, 57, 58 and 59, provided with regulable dampers 52, 53, 54 and 55, respectively. The said secondary air ports are tangentially arranged with respect to the furnace chamber 4 along the furnace length.

The front end of the cyclone furnace 4A forms an advantageous location for the insertion of a gas burner at 65, to start up the furnace. Gas is discharged to the burner through a conduit 62, which is provided with a regulable valve 63, and combustion air is supplied to the burner from a conduit 60, which is connected to the branch conduit 51 and provided with a regulable damper 61.

The cyclone furnace 4A is of horizontally elongated substantially circular cross-section with its major axis arranged substantially horizontal. The furnace chamber 4 is formed by closely-spaced studded tubes covered by a layer of suitable refractory material, as generally disclosed in U.S. Patent No. 2,594,312. The streams of secondary air discharging from secondary air ports 7, 8, 9 and 10 enter the furnace chamber 4 in the same angular direction as the direction of rotation and at the outer side of the streams of fuel laden air discharging from the fuel inlets 12, 13, 14, 15, 16 and 17. The mixture ratios are preferably controlled so that the mixture having the highest ratio of high quality fuel to low quality fuel is arranged to travel through the longest combustion path and the mixture having the lowest ratio of high quality to low quality fuel is arranged to travel through a shorter portion of the same combustion path. With the secondary air streams entering the furnace chamber 4 as described, there will be a gradual merging of the secondary air streams with the enclosed burning streams of primary air and fuel.

Combustion of the fuel particles will progress at a high rate, which increases in the zone of secondary air admission. The normal mean temperature in the furnace chamber 4 can be easily maintained over a wide range of operation substantially above the fuel ash fusion temperature. Under such combustion conditions, the ash content of the fuel is rapidly released and due to the centrifugal effect thereon, the furnace chamber walls, and particularly the circumferential wall, will be rapidly coated with a film of molten ash or slag which adheres to the refractory inner surface of the furnace walls and provides a sticky surface against which the fuel particles in the contacting fuel-air streams are thrown and to which they adhere. The whirling stream of burning fuel and gases effects a scrubbing and burning of the fuel particles on the slag film on the furnace wall. Most of the lighter fuel particles burn in suspension while in the whirling stream along the circumferential wall and the heavier fuel particles on the chamber walls, the slag coating thereon acting to retard the travel of the fuel particles and to retain them in the furnace chamber until their combustion is complete. The air pressures at the secondary air ports are so regulated as to have a descending pressure gradient from rear to front, thus forcing the whirling gas stream to move forwardly initially in a helical path. By way of example, and not of limitation, maximum load operation has been found satisfactory with the following secondary air port pressures: 20 inches of water at port 10, 14 inches of water at air port 9, 10 inches of water at air port 8 and 6 inches of water at air port 7. The front end of the furnace chamber is provided with a rearwardly flaring frustoconical section 4b so arranged that the forwardly moving whirling gas stream is forced to move in a smaller helical path in the opposite axial direction from the first helical path so as to develop an increased centrifugal force on the entrained particles, causing such particles to be thrown against the slag-coated furnace walls or to be burned in suspension in the zone adjacent to the furnace walls. The rearwardly moving whirling gas stream then discharges through a concentric gas outlet 5, formed by an inwardly projecting throat tapering towards the front end of the furnace chamber 4, into a secondary combustion chamber 18, then through a boiler slag screen 19 into the combustion chamber 1. The molten slag collecting in the bottom of the furnace chamber 4 is discharged therefrom through a slag outlet 6 into the secondary combustion chamber 18, then flows downwardly through the slag screen 19 into a slag tank, not shown, which surrounds the slagging table 3.

While in accordance with the provisions of the statutes we have illustrated and described herein a specific form of the invention now known to us, those skilled in the art will understand that changes may be made in the form of the apparatus disclosed without departing from the spirit of the invention covered by our claims, and that certain features of the invention may sometimes be used to advantage without a corresponding use of other features.

What is claimed is:

1. The process of burning a particle-form ash-containing low quality fuel in a combustion chamber of substantially circular cross-section having a restricted gas outlet at one end, which comprises mixing said low quality fuel with a particle-form ash-containing high quality fuel in substantially different ratios of high quality fuel to low quality fuel, introducing the fuel mixture in suspension in a high-velocity stream of air into said combustion chamber at spaced positions along the length thereof so as to whirl about the axis of said chamber and with the fuel mixture having the highest ratio of high quality fuel to low quality fuel arranged to travel through the longest combustion path and the mixture having the lowest ratio of high quality fuel to low quality fuel arranged to travel through a shorter portion of the combustion path, introducing a plurality of high-velocity streams of combustion air tangentially to the circumferential wall of said combustion chamber in the same direction of rotation as said fuel mixture streams and at spaced positions along the length thereof, regulating the pressures of said streams of combustion air to produce a pressure gradient adjacent the points of combustion air admission longitudinally increasing towards said gas outlet end and thereby cause the burning fuel and air stream to move forwardly of said combustion chamber towards the end opposite the gas outlet thereof through a helical path along the circumferential wall of the combustion chamber, and causing the burning fuel and air stream to be reversed inwardly and then move rearwardly in a smaller helical path to the gas outlet end of the combustion chamber.

2. The process of burning a particle-form ash-containing low quality fuel in a combustion chamber of substantially circular cross-section having a concentric gas outlet of smaller cross-section at one end, which comprises mixing said low quality fuel with a particle-form ash-containing high quality fuel in substantially different ratios of high quality fuel to low quality fuel, introducing the fuel mixture in suspension in a high-velocity stream of air into said combustion chamber at spaced positions along the length thereof so as to whirl about the axis of said chamber while maintaining a normal mean temperature in said combustion chamber above the fuel ash fusion temperature and with the fuel mixture having the highest ratio of high quality fuel to low quality fuel arranged to travel through the longest combustion path and the mixture having the lowest ratio of high quality fuel to low quality fuel arranged to travel through a shorter portion of the combustion path, introducing a plurality of high-velocity streams of combustion air tangentially to the circumferential wall of said combustion chamber at spaced positions along the length thereof, regulating the pressures of said streams of combustion air to produce a pressure gradient adjacent the points of combustion air admission longitudinally increasing towards said gas outlet end and thereby cause the burning fuel and air stream to move forwardly of said combustion chamber towards the end opposite the gas outlet thereof through a helical path along the circumferential wall of the combustion chamber of sufficient length to cause deposition of slag on the circumferential wall to form a sticky surface thereon to which fuel particles adhere and are scrubbed by the contacting gases, causing the burning fuel and air stream to be reversed inwardly and then move rearwardly in a smaller helical path to the gas outlet end of the combustion chamber, and collecting and withdrawing the ash separated in the combustion chamber in a molten condition from the lower part of the chamber.

3. A process according to claim 2 in which a separate stream of high quality fuel and air is burned in an annular path adjacent to and surrounding said gas outlet.

4. The process of burning a particle-form ash-containing low quality fuel in a combustion chamber of substantially circular cross-section arranged with its major axis substantially horizontal and having a concentric gas outlet of smaller cross-section at one end, which comprises mixing said low quality fuel with a particle-form ash-containing high quality fuel in substantially different ratios of high quality fuel to low quality fuel, introducing the fuel mixture in suspension in a high-velocity stream of air into said combustion chamber at spaced positions along the length thereof so as to whirl about the axis of said chamber while maintaining a normal mean temperature in said combustion chamber above the fuel ash fusion temperature and with the fuel mixture having the highest ratio of high quality fuel to low quality fuel arranged to travel through the longest combustion path and the mixture having the lowest ratio of high quality fuel to low quality fuel arranged to travel through a shorter portion of the combustion path, introducing a plurality of high-velocity streams of combustion air tangentially to the circumferential wall of said combustion chamber in the same direction of rotation as and outside of said fuel mixture streams and at spaced positions along the length thereof, regulating the pressures of said streams of combustion air to produce a pressure gradient adjacent the points of combustion air admisison longitudinally increasing towards said gas outlet end and thereby cause the burning fuel and air stream to move forwardly of said combustion chamber towards the end opposite the gas outlet thereof through a helical path along the circumferential wall of the combustion chamber of sufficient length to cause combustion of the fuel mixture and the release of recoverable ash in the fuel therein and the deposition of slag on the circumferential wall to form a sticky surface thereon to which fuel particles adhere and are scrubbed by the contacting gases, causing the burning fuel and air stream to be reversed inwardly and then move rearwardly in a smaller helical path to the gas outlet end of the combustion chamber and to discharge from said end of the chamber at a higher velocity, and collecting and withdrawing the ash separated in the combustion chamber in a molten condition from the lower part of the chamber.

5. The process of burning a fluent fuel at high rates of heat release in a combustion chamber of substantially circular cross-section having a restricted gas outlet at one end thereof, which comprises introducing streams of fuel at a high velocity into said combustion chamber at spaced positions along the length thereof so as to whirl about the axis of said chamber, introducing a plurality of high-velocity streams of combustion air tangentially to the circumferential wall of said combustion chamber and at spaced positions along the length thereof, causing the burning fuel and air streams to move initially in a helical path through said chamber along the circumferential wall thereof towards the end opposite the gas outlet by regulating the pressures of said streams of combustion air so that the pressure in the combustion chamber along a line adjacent the circumferential wall and parallel to the axis of the combustion chamber progressively increases in the direction of the gas outlet end, and then causing the burning fuel and air streams to be deflected at the opposite end of said chamber inwardly and reversely towards the axis of said chamber and in the direction of said gas outlet, the path of travel of the burning fuel and air streams being of sufficient length to cause substantially complete combustion of the fuel.

6. The process of burning a fluid fluent at high rates of heat release in a combustion chamber of substantially circular cross-section having a restricted gas outlet at one end thereof, which comprises introducing streams of fuel at a high velocity into said combustion chamber at spaced positions along the length thereof so as to whirl about the axis of said chamber, introducing a plurality of high-velocity streams of combustion air tangentially to the circumferential wall of said combustion chamber in the same direction of rotation as and at the outer side of the whirling streams of fuel and at spaced positions along the length thereof, causing the burning fuel and air streams to move initially in a helical path through said chamber along the circumferential wall thereof towards the end opposite the gas outlet by regulating the pressures of said streams of combustion air so that the pressure in the combustion chamber along a line adjacent the circumferential wall and parallel to the axis of the combustion chamber progressively increases in the direction of the gas outlet end, and then causing the burning fuel and air streams to be deflected at the opposite end of said chamber inwardly and reversely towards the axis of said chamber and in the direction of said gas outlet, the path of travel of the burning fuel and air streams being of sufficient length to cause substantially complete combustion of the fuel.

7. The process of burning a particle-form ash containing solid fuel at high rates of heat release in a combustion chamber of substantially circular cross-section having a restricted gas outlet at one end thereof, which comprises introducing streams of air and fuel at a high velocity into said combustion chamber at spaced positions along the length thereof so as to whirl about the axis of said chamber while maintaining a normal mean temperature in said chamber above the fuel ash fusion temperature, introducing the remaining portions of air required for combustion in a plurality of high-velocity streams tangentially to the circumferential wall of said chamber and at spaced positions along the length thereof, causing the burning fuel and air streams to move initially in a helical path through said chamber along the circumferential wall thereof towards the end opposite the gas outlet by regulating the pressures of said streams of combustion air so that the pressure in the combustion chamber along a line adjacent the circumferential wall and parallel to the axis of the combustion chamber progressively increases in the direction of the gas outlet end, then causing the burning fuel and air streams to be deflected at the opposite end of said chamber inwardly and reversely towards the axis of said chamber and in the direction of said gas outlet, the path of travel of the burning fuel and air streams being of sufficient length to cause complete combustion of the fuel and the release of substantially all of the recoverable ash in the fuel in a molten condition therein and the formation of a slag layer on the circumferential wall to which fuel particles adhere and are scrubbed by the contacting gases, and withdrawing separated ash in a molten condition from the lower part of the combustion chamber.

8. The process of burning a particle-form ash containing solid fuel at high rates of heat release in a combustion chamber of substantially circular cross-section having a restricted gas outlet at one end thereof, which comprises introducing streams of air and fuel at a high velocity into said combustion chamber at spaced positions along the length thereof so as to whirl about the axis of said chamber while maintaining a normal mean temperature in said chamber above the fuel ash fusion temperature, introducing the remaining portions of air required for combustion in a plurality of high-velocity streams tangentially to the circumferential wall of said chamber in the same direction of rotation as and at the outer side of the whirling streams of air and fuel and at spaced positions along the length thereof, causing the burning fuel and air streams to move initially in a helical path through said chamber along the circumferential wall thereof towards the end opposite the gas outlet by regulating the pressures of said streams of combustion air so that the pressure in the combustion chamber along a line adjacent the circumferential wall and parallel to the axis of the combustion chamber progressively increases in the direction of the gas outlet end, then causing the burning fuel and air streams to be merged and deflected at the opposite end of said chamber inwardly and reversely towards the axis of said chamber and in the direction of said gas outlet, the path of travel of the burning fuel and air streams being of sufficient length to cause complete combustion of the fuel and the release of substantially all of the recoverable ash in the fuel in a molten condition therein and the formation of a slag layer on the circumferential wall to which fuel particles adhere and are scrubbed by the contacting gases, and withdrawing separated ash in a molten condition from the lower part of the combustion chamber.

References Cited in the file of this patent

UNITED STATES PATENTS

| | | |
|---|---|---|
| 867,177 | Welles | Sept. 24, 1907 |
| 2,357,303 | Kerr et al. | Sept. 5, 1944 |
| 2,433,075 | Washburn et al. | Dec. 23, 1947 |

FOREIGN PATENTS

| | | |
|---|---|---|
| 157,368 | Australia | July 1, 1954 |
| 1,025,395 | France | Apr. 14, 1953 |
| 627,759 | Germany | Mar. 23, 1936 |
| 692,393 | Great Britain | June 3, 1953 |